Patented Feb. 5, 1946

2,394,362

UNITED STATES PATENT OFFICE 2,394,362

TREATMENT OF TUNGSTEN ORES

Blair Burwell, Grand Junction, Colo., assignor to United States Vanadium Corporation, a corporation of Delaware No Drawing. Application March 30, 1943,
Serial No. 481,100

5 Claims. (Cl. 23—18)

The invention relates to the treatment of low-grade tungsten ores for recovery of the tungsten contained therein.

In the copending application of Joseph H. Brennan and Blair Burwell, Serial No. 454,762, filed August 14, 1942, there is described a process for the recovery of tungsten from low-grade tungsten ores containing such tungsten minerals as scheelite, wolframite, ferberite and hübnerite. The process disclosed in that application includes the step of digesting the ore to be treated with an alkaline digestant at superatmospheric pressure and elevated temperature to take the tungsten into solution as an alkali metal tungstate. The tungsten solution obtained is later treated to produce calcium tungstate. This process is eminently satisfactory for the treatment of tungsten ores in which the tungsten occurs as a mineral of the type mentioned—indeed it is the only commercially feasible method yet developed for efficient extraction of tungsten from such low-grade ores.

However, there exist in the vicinity of Golconda, Nevada, ferruginous and manganiferous ores containing tungsten in no recognized mineral form, and these ores are not amenable to efficient separation and recovery of tungsten therefrom by the pressure digestion process referred to. Neither can tungsten be recovered from these ores by more usual ore dressing processes of the jigging, tabling or flotation type. A process for effectively recovering tungsten from the large, readily available deposits of ores of this type is desired.

It is the chief object of this invention to provide such a process.

The invention by the practice of which this object is achieved, comprises the step of roasting a low-grade tungsten ore of the type under discussion prior to digesting it with an alkali digestant. The roasting step puts the ore into a condition in which it is amenable to efficient separation and recovery of tungsten therefrom, one effect of the roasting step being to render the ore porous to a desirable degree and another being to render phosphorus compounds less soluble in the alkali digestant.

In the practice of the invention, the ore to be treated is roasted at temperatures within the range 700° C. to 1100° C. The roasting temperature employed has a bearing on the quantity of tungsten that can be extracted by digestion with an alkaline solution. Subsequent extraction of tungsten is generally more complete the higher the roasting temperature employed, up to roasting temperatures in the neighborhood of 1000° C. If the roasting temperature is much higher than 1000° C., the amount of tungsten that can later be extracted is decreased.

It is preferred that the ore to be treated be finely ground, say to pass a 100 mesh (0.147 mm. openings) screen. The ore is then roasted under oxidizing conditions, preferably at a temperature within the range 800° C. to 1000° C. for at least about one-half hour at the higher temperatures or 3 hours at the lower temperatures within the range. After the roasting step, the ore may be digested with an aqueous solution of an alkali metal compound, preferably a solution of an alkali metal hydroxide or carbonate, for example an excess of sodium carbonate, at steam pressures of about 130 to 200 pounds per square inch. The alkali solution containing dissolved tungsten may then be separated from the undissolved residue, the excess carbonate neutralized with acid or otherwise, and treated with a soluble calcium compound such as lime or calcium chloride to precipitate calcium tungstate.

The increased extraction of tungsten made possible by the method of the invention has been demonstrated by many tests. For instance, in one series of experiments, extraction of the tungsten from a Golconda, Nevada ore containing 3.98% tungsten trioxide ($WO_3$) was desired. In attempts to extract the tungsten by digesting the ore with sodium carbonate at a steam pressure of 145 pounds per square inch, only 42.2% of the tungsten was extracted when 675% of the theoretical amount of alkali necessary to combine with all of the tungsten was used, and when 1350% of the theoretical amount of alkali was used, only 42.8% of the tungsten was recovered. However, when a sample of the same ore was roasted at 1000° C. for three hours and then digested with 675% of the theoretical amount of alkali at a steam pressure of 145 pounds per square inch, 82% of the tungsten in the ore was extracted.

In another series of experiments, a 3000 gram sample of a Golconda ore containing 2.79% $WO_3$ was digested with 2000 grams of soda ash and about 13,000 grams of water for 1.5 hours at 200 pounds per square inch steam pressure. An extraction of 41.2% of the tugnsten in the ore was obtained. A 3000 gram sample of a similar ore containing 3.74% $WO_3$ was roasted at 900° C. for two hours and then digested at a steam pressure of 200 pounds per square inch with 2000 grams of soda ash and 13,000 grams of water. An extraction of 98.7% of the tungsten in the ore was obtained. These experiments clearly show the marked improvement in the extraction of tungsten obtained when these ores are roasted in accordance with the invention prior to digesting them with alkali.

Phosphorus is a not uncommon impurity in tungsten ores. If present, it may be extracted concurrently with the tungsten from the ore during the digestion step and if so, will contaminate the calcium tungstate later produced. The extraction of phosphorus may be suppressed, however, if the ore to be treated is mixed with lime before roasting and the lime-ore mixture is roasted. Although the optimum amount of lime to employ for the suppresison of phosphorus extraction will vary with different ores and will accordingly have to be determined empirically, in general, good results are obtained if lime in a proportion of about 5% to 10% by weight of the ore to be treated is present with the ore during roasting.

The effect of the presence of lime in the roasting step in suppressing the extraction of phosphorus is illustrated by results of typical tests. A sample of ore containing 3.98% $WO_3$ and 0.85% $P_2O_5$ (21.4 parts of $P_2O_5$ per 100 parts of $WO_3$) was roasted for two hours at about 1000° C. and was then digested to extract the tungsten. The liquid recovered from the digestion step contained 1.61 parts of $P_2O_5$ per 100 parts of $WO_3$. A similar sample of ore treated in the same way except roasted in the presence of lime in a proportion of 5% by weight of the ore sample before digestion yielded a liquor containing only 0.46 part of $P_2O_5$ per 100 parts of $WO_3$, and a sample roasted with lime in a proportion of 10% of the weight of the ore yielded a liquor containing only 0.13 part of $P_2O_5$ per 100 parts of $WO_3$.

That roasting the ore in the presence of lime does not materially decrease the extraction of tungsten from the ore has also been shown by tests. For example, a 3000 gram sample of ore containing 3.15% $WO_3$ was ground with 300 grams of lime and the mixture roasted for two hours at 900° C. The roasted material was digested with 2000 grams of soda ash and about 13,000 grams of water for 1.5 hours at 200 pounds per square inch steam pressure. Of the tungsten containing in the ore sample, 96% was extracted.

The specific instances of the practice of the invention described herein serve merely to illustrate its principles, and the invention is not limited thereby.

I claim:

1. A process of recovering tungsten from a low-grade ore material containing that element and substantially free from tin, which process comprises roasting said ore at a temperature between about 700° C. and 1100° C., and then digesting the roasted ore at superatmospheric steam pressure of about 130 to 200 pounds per square inch with an aqueous solution of an alkali metal compound to extract the tungsten therefrom.

2. A process of recovering tungsten from a low-grade ore material containing that element and, as in impurity, phosphorus, which process comprises mixing such ore with lime in a proportion of about 5% to 10% of the weight of the ore, roasting the ore-lime mixture at a temperature of about 700° C. to 1100° C., and then digesting the roasted ore at superatmospheric pressure with a solution of an alkali metal compound to extract the tungsten therefrom.

3. In the process of recovering tungsten from a low-grade ore material containing that element but substantially free from tin, which process comprises digesting said ore material at superatmospheric pressure with an aqueous solution of an alkali metal compound to extract the tungsten therefrom, the improvement which comprises roasting said ore at a temperature between about 800° C. and 1000° C. before digesting the ore.

4. In the process of recovering tungsten from a low-grade ore material containing that element, and as an impurity, phosphorus, which process comprises digesting said ore material at superatmospheric pressure with a solution of an alkali metal compound to extract the tungsten therefrom, the improvement which comprises mixing such ore with lime in a proportion of about 5% to 10% of the weight of the ore, and roasting the ore-lime mixture at a temperature of about 700° C. to 1100° C. before digesting the ore.

5. A process of recovering tungsten from a low-grade ore material containing that element, which process comprises roasting said ore material at a temperature between about 800° C. and 1000° C., and digesting the roasted ore material at a steam pressure of about 130 to 200 pounds per square inch with an aqueous solution of an alkali metal compound selected from the group consisting of alkali metal hydroxides and alkali metal carbonates to extract the tungsten therefrom.

BLAIR BURWELL.